Sept. 20, 1966  J. W. FROST  3,273,610
VALVED PRESSURIZED FLUID DISPENSING RECEPTACLE
WITH RECEPTACLE-ATTACHED FITTING
Original Filed Aug. 7, 1961  12 Sheets-Sheet 1

INVENTOR.
JOHN W. FROST
BY
*John L. Diehl*
ATTORNEY

FIG. 5

INVENTOR.
JOHN W. FROST
BY
ATTORNEY

Sept. 20, 1966 J. W. FROST 3,273,610
VALVED PRESSURIZED FLUID DISPENSING RECEPTACLE
WITH RECEPTACLE-ATTACHED FITTING
Original Filed Aug. 7, 1961 12 Sheets-Sheet 3

INVENTOR.
JOHN W. FROST
BY
ATTORNEY

FIG. 9

INVENTOR.
JOHN W. FROST
BY
ATTORNEY

Sept. 20, 1966  J. W. FROST  3,273,610
VALVED PRESSURIZED FLUID DISPENSING RECEPTACLE
WITH RECEPTACLE-ATTACHED FITTING
Original Filed Aug. 7, 1961  12 Sheets-Sheet 5

INVENTOR.
JOHN W. FROST

BY

ATTORNEY

Sept. 20, 1966 J. W. FROST 3,273,610
VALVED PRESSURIZED FLUID DISPENSING RECEPTACLE
WITH RECEPTACLE-ATTACHED FITTING
Original Filed Aug. 7, 1961 12 Sheets-Sheet 6

INVENTOR.
JOHN W. FROST
BY
*John L. Neil*
ATTORNEY

FIG. 15

Sept. 20, 1966  J. W. FROST  3,273,610
VALVED PRESSURIZED FLUID DISPENSING RECEPTACLE
WITH RECEPTACLE-ATTACHED FITTING
Original Filed Aug. 7, 1961  12 Sheets-Sheet 8

INVENTOR.
JOHN W. FROST

BY
ATTORNEY

Sept. 20, 1966 J. W. FROST 3,273,610
VALVED PRESSURIZED FLUID DISPENSING RECEPTACLE
WITH RECEPTACLE-ATTACHED FITTING
Original Filed Aug. 7, 1961 12 Sheets-Sheet 9

FIG. 17

INVENTOR.
JOHN W. FROST
BY
ATTORNEY

INVENTOR.
JOHN W. FROST
BY
ATTORNEY

Sept. 20, 1966  J. W. FROST  3,273,610
VALVED PRESSURIZED FLUID DISPENSING RECEPTACLE
WITH RECEPTACLE-ATTACHED FITTING
Original Filed Aug. 7, 1961  12 Sheets-Sheet 12

INVENTOR.
JOHN W. FROST
BY
*John L. Diehl*
ATTORNEY

United States Patent Office 3,273,610
Patented Sept. 20, 1966

1

3,273,610
VALVED PRESSURIZED FLUID DISPENSING RECEPTACLE WITH RECEPTACLE-ATTACHED FITTING
John W. Frost, 512 E. Parkway Blvd., Appleton, Wis.
Continuation of application Ser. No. 129,816, Aug. 7, 1961. This application Apr. 16, 1964, Ser. No. 363,046
5 Claims. (Cl. 141—353)

This application is a continuation of my application Serial Number 129,816, filed August 7, 1961, which is now abandoned.

This invention relates to a device comprising an appliance for dispensing a fluid and utilizing the potential energy stored in the fluid by reason of said pressurization, and particularly relates to such a device comprising a pressurized valved receptacle containing a fluid under pressure and more particularly relates to means for maintaining such a receptacle as part of such a device.

Appliances which dispense a fluid such as butane, "Freon" or the like and utilize the potential energy of the fluid which it has by reason of being contained under pressure in a container include stove burners, torch burners, lamp burners, gas-operated horns (normally referred to as air horns), and certain carburetion systems for internal combustion engines. In the burners, the energy of the fluid is utilized to induce a flow of ambient air in conjunction with the gas and to mix the gas and the air. In horns, the energy of the gas is utilized to resonantly vibrate a diaphragm or to cause resonant motion of a portion of ambient air to produce audible sound waves. In carburetors, the energy in the fluid is utilized to provide atomization of the fluid as it leaves the jet.

Such appliances are well known and the use of pressurized receptacles in conjunction with such appliances as storage containers for the fluid utilized in the appliance is also well known.

However, simple means of incorporating such receptacles into such appliances has been desired and is provided by this invention as the object thereof.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

2

Referring now to FIGURES 1, 3, 4 and 5, receptacle 20 may contain fluid 21 under pressure and is provided with a dished metal closure member 22 having a horizontally extending annular bottom 23 and outer circular portion 24 extending upwardly from the outer edge 25 of annular bottom 23 and extending inwardly at its upper portion 26 to terminate at its upper peripheral portion 27 with a crimped seal 28 to the body of receptacle 20. Member 22 has inner portion 30 extending upwardly from the inner edge 31 of annular bottom 23 and a substantially annular top portion 32 having hole 33 in the center thereof through which tubular member 34 extends from valve 35 to dispense fluid 21, which enters valve 35 through dip tube 36.

In accordance with the invention, apparatus is provided to maintain receptacle 20 in engaged relation with any one of a large number of appliances, of which a few representative types are described hereinbelow. A portion of such appliance may be receiver member indicated generally as 11 which may comprise body 40 having inner wall 41 which defines space 42 within the body and orifice member 43 having orifice 44 to receive the upper end of tube 34; orifice member 43 may be attached to body 40 in any suitable manner. Tube or duct 46 may extend from space 42 outwardly through the body 40 of receiver 11 and thence through the outer wall of body 40 and thence to other parts of the appliance as described hereinafter.

Orifice 44 provides a communicating passage or duct from the interior of receptacle 20 through dip tube 36, thence through valve 35, thence through the interior of tube 34, thence through orifice 44 to space 42, and communication is provided from space 42 with another part of the appliance through tube or duct 46. Substantially circular, downwardly extending member 55 is provided attached to receiver 11 as shown and member 55 may be stamped out to provide openings 58 having lower surfaces 53, each of which extends in an arc around the axes of orifice 44 and the orifice provided by the interior tube 34 and each of which extends somewhat upwardly from its points of beginning to its point of ending.

Figure 5:
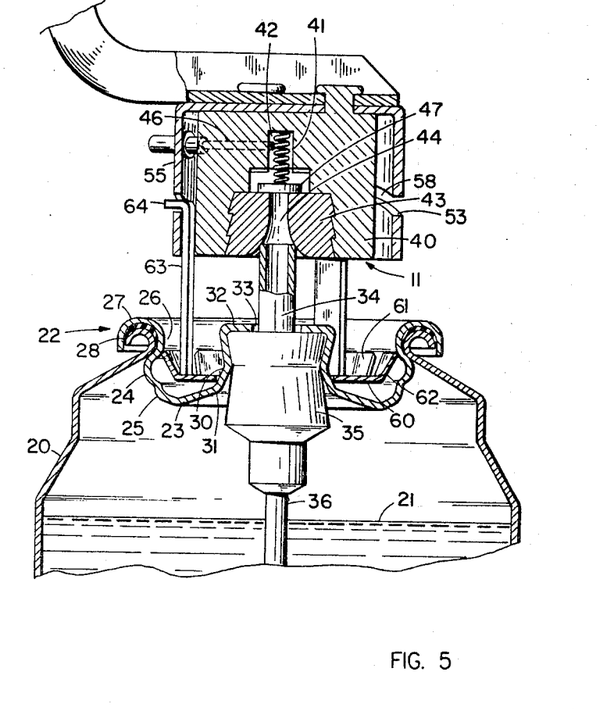
FIGURE 5 is a cross-sectional view of the embodiment of FIGURE 3 in operation.

Receptacle 20 is provided with annular member 60, which surrounds portion 30 of closure 22 and lies tightly against bottom 23 of closure 22. Member 60 is substantially centered about the axis of the orifice provided by the interior of tube 34 and has six or eight portions or projecting members 61 which extend diagonally upward and outward from outer periphery 62 of member 60, so that the ends of members 61 bite into or extend into the metal of portion 26 of closure 22 to hold member 60 against bottom 23. Member 60 is also provided with four portion or projecting members which extend upward from periphery 62; these members 63 at their upper ends extend substantially horizontally, preferably outwardly as shown at 64, and may be said to constitute upwardly extending portions 63 and horizontally or outwardly extending portions 64. Portions 64, in a less preferred embodiment may extend inwardly. As shown in FIGURE 5 each of portions 64 may engage one of surfaces 53.

Figures 1, 4:
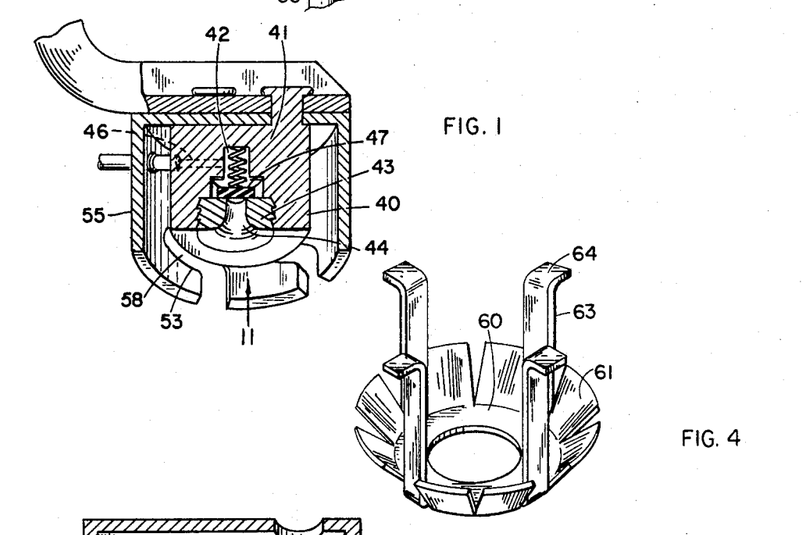
FIGURE 1 is a cross-sectional perspective view of one embodiment of one portion of the invention.
FIGURE 4 is a perspective view of the embodiment of FIGURE 3.
Figure 2:
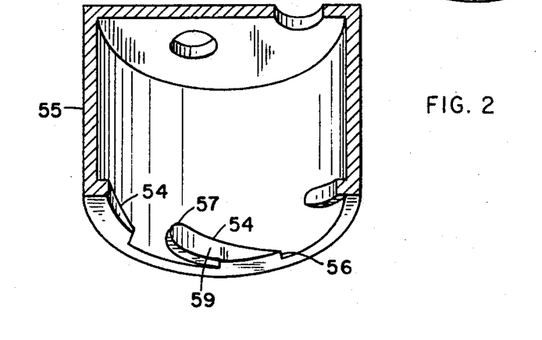
FIGURE 2 is a cross-sectional perspective view of another embodiment of the device of FIGURE 1.

Referring now to FIGURE 2, there is shown a modification of the embodiment of FIGURE 1 wherein cylindrically downwardly extending member 55 is not provided with stamped out portions but is provided with molded inwardly extending members 59, having ramp-like top surfaces which cannot be seen in FIGURE 2 but which are indicated at 54 and which extend arcuately around the axis of orifice 44′ in receiver 11′ and extend upwardly from their point of beginning at 56 to their point of ending at 57. Members 59 rather than being molded or die-cast as shown, may be provided by welding them onto the interior of cylindrical member 55 or by stamping out member 55 to cause members 59 to extend inwardly, being provided by the material of member 55, it being important that the upper surfaces of each of members 59 be flat, ramp-like surfaces. In other words, they cannot be angular as are screw threads, or the device won't work, because the outer edges of portions 64 bite into the surfaces so that they cannot be engaged with members 59 and also members 64 tend to slip inwardly and downwardly off the surfaces that aren't flat, by reason of members 63 bending inwardly.

In effect, the invention depends effectively on members 64 being hooked over surfaces 53 or 54.

In order to provide engagement of receptacle 20 with receiver 11 as shown in FIGURE 5, receptacle 20 is forced upwardly toward receiver 11 until tube 34 engages the inner surface of orifice member 43, that is, the walls of orifice 44, each of portions 64 being located at the point of beginning of one of surfaces 53. Then receptacle 20 is slightly twisted so that each of portions 64 engages one of surfaces 53 and is thereby in effect hooked over it. The force of such engagement may be increased somewhat by increasing the twisting force applied in order to create a wedging action due to the fact that each of surfaces 53 extends somewhat upwardly from its point of beginning to its point of ending.

Figure 9:
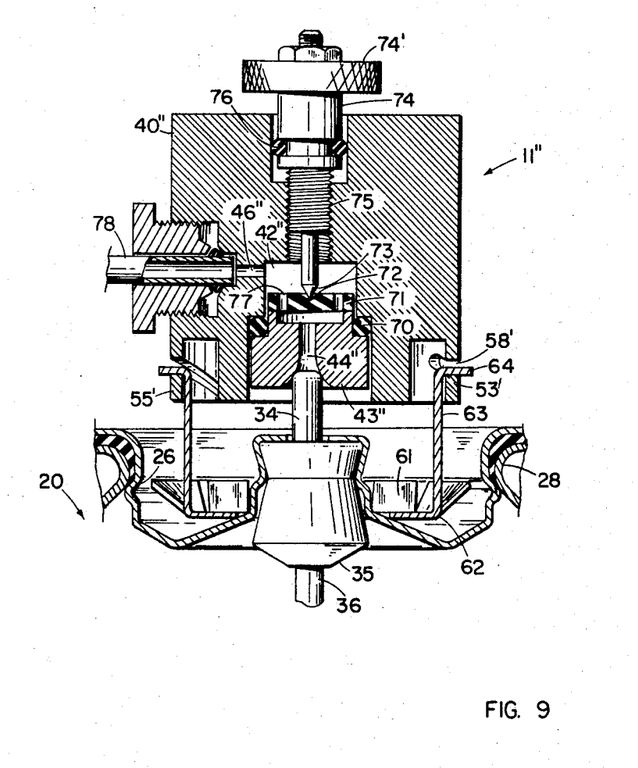
FIGURE 9 is a cross-sectional view of a modification of the invention.

There may be provided within receiver 11 a check valve indicated generally as 47, or said check valve may be omitted as shown in FIGURE 9, wherein a modified form of receiver 11 is indicated as 11″.

Figure 3:
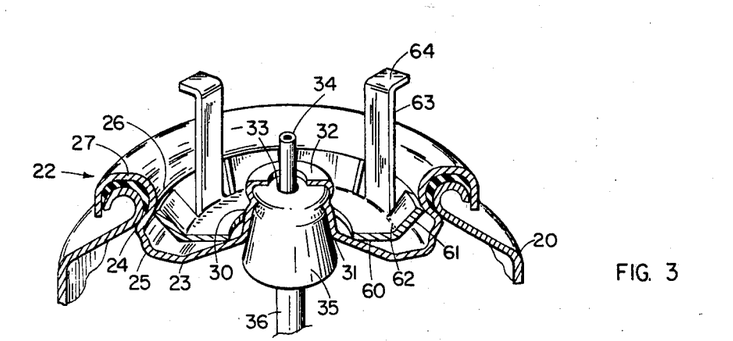
FIGURE 3 is a cross-sectional perspective view of one embodiment of another portion of the device which may co-act with the embodiment of either FIGURE 1 or FIGURE 2.
Figure 6:
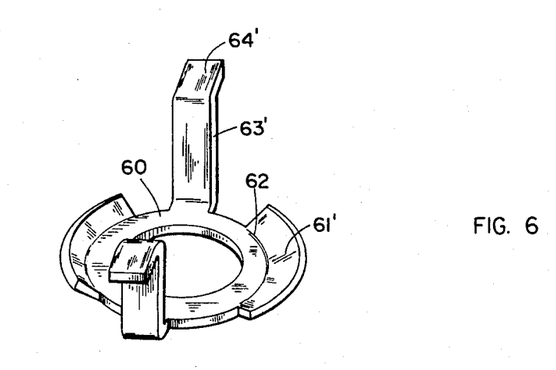
FIGURE 6 is a perspective view of a modification of the embodiment of FIGURES 3 and 4.

Referring now to FIGURE 6, there is shown a modification of the embodiment of FIGURES 3 and 4 wherein member 60 is provided with only 2 members 61′ extending diagonally outward and upward from its periphery 62, and with only 2 members 63′ which extend upwardly from periphery 62 and have outwardly extending portions 64′ at their upper end.

Figure 7:
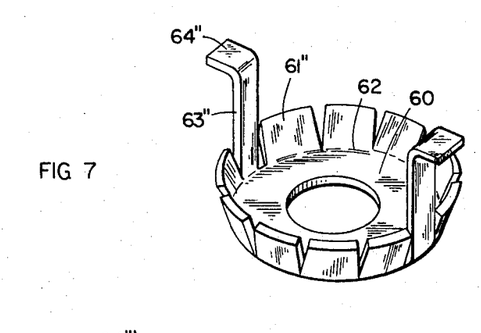
FIGURE 7 is a perspective view of another modification of the embodiment of FIGURES 3 and 4.

In the embodiment of FIGURE 7, member 60 is provided with 10 members 61″ and 2 members 63″, which function as do members 61 and 63 respectively.

Figure 8:
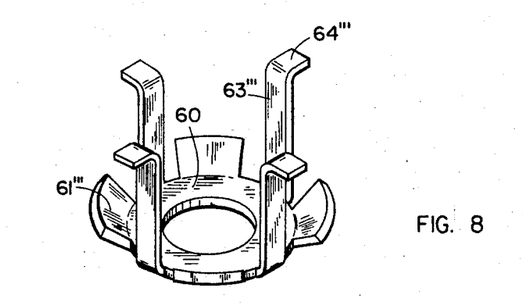
FIGURE 8 is a perspective view of another modification of the embodiment of FIGURES 3 and 4.

In FIGURE 8, a modification is shown in which member 60 is provided with 4 members 1‴ and four members 63‴ having outwardly extending portions 64‴ at their upper end. Members 61′, 61″, 61‴, 63′, 63″, 63‴, 64′, 64″, 64‴ operate in the same manner as do members 61, 63 and 64.

It should be mentioned that valve 35 is adapted to be opened by creating downward movement of tube 34. Thus, by engaging receptacle 20 with receiver 11 as shown in FIGURE 5, member 34 is forced downward into valve 35, the valve is thereby opened, and fluid 21 is dispensed upward through tube 36, valve 35, tube 34, orifice 44, space 42, duct 46, and thence to other parts of the appliance.

Referring now to FIGURE 9, it may be pointed out with respect to those parts which are different from those of figures hereinbefore described, and therefore differently numbered, that receiver 11″ comprises body 40″ and orifice member 43″ having orifice 44″ which is engaged by the upper end of tube 34. Member 43″ is slidably received within a cylindrical interior portion of body 40″ and sealed thereto with sealing member 70, which may be an O-ring, as shown.

Portions 64 of members 63 are received in spaces 58′ and engage surfaces 53′ in member 55′ to maintain engagement of 20 with receiver 11, in the same manner as with surfaces 53 in member 50.

Figure 10:
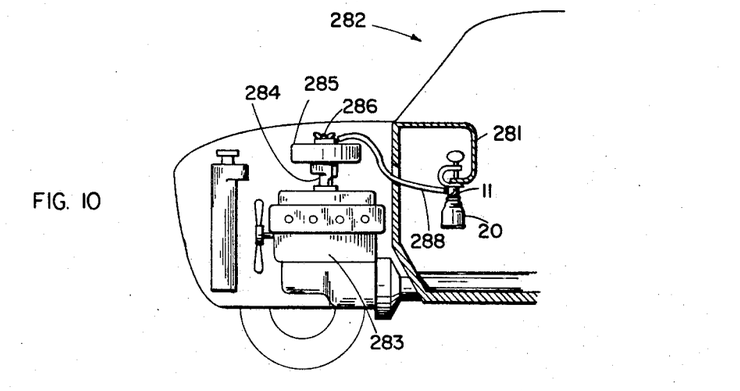
FIGURE 10 is a cross-sectional schematic view showing the device applied to an internal combustion engine, especially the carburetion system of an internal combustion engine.

Disc 71 has indentation 72 in the center of its upper surface to receive point 73 of valve member 74, which is threadedly engaged at 75 with body 40 and sealed with sealing member 76 to prevent outward leakage between valve member 74 and body 40″; member 76 may be an O-ring as shown. Disc 71 may have the same diameter as the outer diameter of the upper portion of member 43″ and is provided with a plurality of holes 77 extending upwardly therethrough. Duct 46″ may extend from interior space 42″ defined by the inner wall of body 40″ to the interior of tube 78, which may extend to one or more other parts of the appliance, as described hereinafter. By rotation of valve handle 74′ attached to valve member 74, member 74 may be rotated, and by reason of its threaded engagement at 75, it moves downwardly to move disc 71 downwardly which force member 43″ and tube 34 downwardly to open valve 35, whereupon fluid 21 is dispensed upwardly through dip tube 36, valve 35, tube 34, into the appliance through orifice 44‴, thence through holes 77, space 42″, and passage 46″ to one or more other parts of the appliance. As shown in FIGURE 10, receiver 11 may be attached to dashboard 281 of land vehicle 282, such as an automobile, having internal combustion engine 283, carburetor 284, and air cleaner 285. Tube 288 may communicate with the interior of receiver 11 and lead to a fitting 286 on top of air cleaner 285, which may provide communication with the interior of the air cleaner and thence through the interior of carburetor 284, so that fluid may be dispensed from receptacle 20 to the appliance consisting of receiver 11, tube 288, and member 286, in order to introduce the fluid into a passage through which one of the reactants (that is, either fuel or air) enters the engine; namely, in the case of FIGURE 10, the interior of the air cleaner through which air enters the engine.

Figures 11, 12:
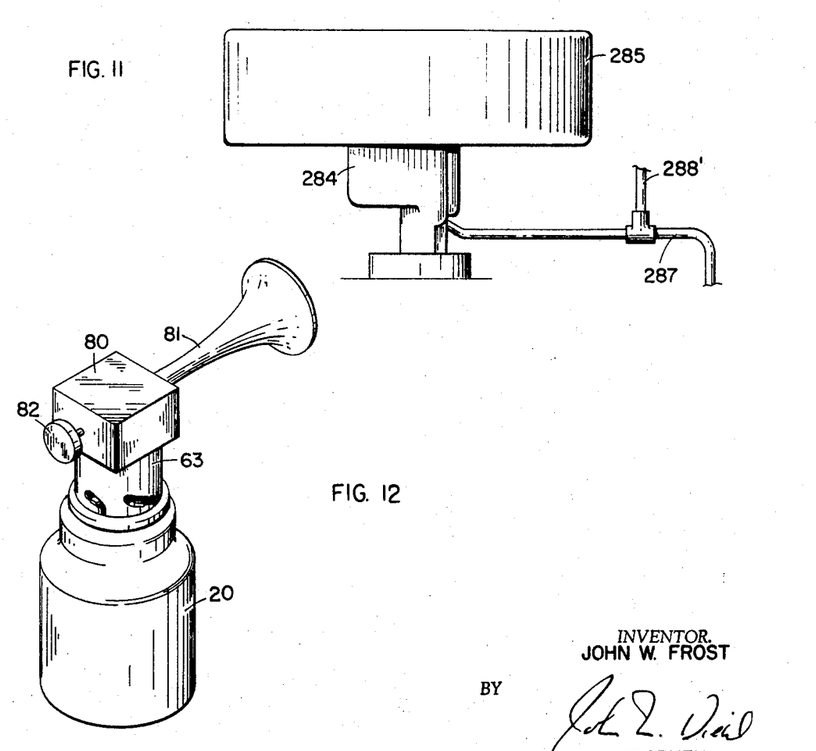
FIGURE 11 is a schematic view of a modification of the embodiment of FIGURE 10.
FIGURE 12 is a perspective view showing the application of the invention to a horn.

A modification is shown in FIGURE 11, wherein tube 288′ leading from receiver 11 is joined by a T to fuel line 287, which leads to carburetor 284, so that fluid from receptacle 20 is dispensed into a different passage through which a different reactant enters the engine; namely, fuel line 287.

Referring now to FIGURE 12, an appliance in accordance with the invention may comprise receptacle 20 attached by members 63 to body 80 of a gas-operated horn having bell 81 and provided with a valve which may be operated by valve operating member 82. The horn is gas operated, so that when operating member 82 is operated, gas is dispensed from receptacle 20 through the horn to create an audible noise. The valve within member 80 and valve-operating member 82 may be omitted so that as long as the appliance is assembled by reason of attachment of receptacle 20 to body 80, the horn is sounded.

Figures 13, 14:
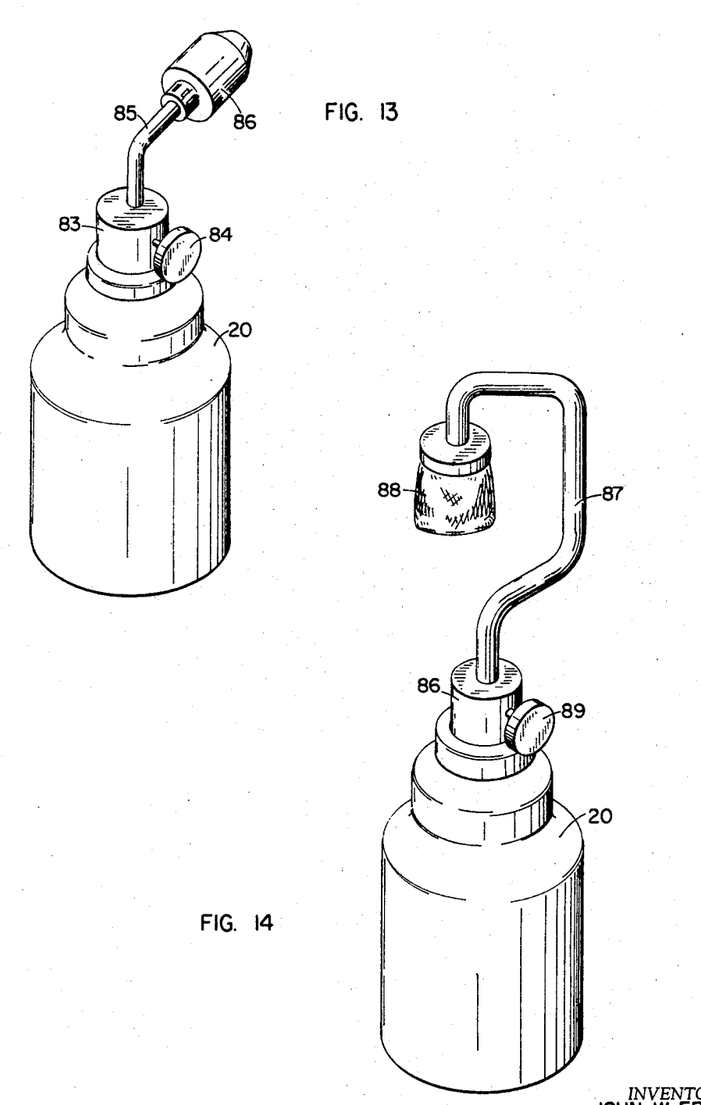
FIGURE 13 is a perspective view showing the application of the invention to a hand torch.
FIGURE 14 is a perspective view showing the application of the invention to a lamp.

Referring now to FIGURE 13, an appliance in accordance with the invention is a hand torch wherein receiver 83 is provided with a valve in the interior thereof (not shown for simplicity) which may be opened by operation of member 84 to dispense fluid (either gas or liquid) from receptacle 20 through tube 85 to burner 86. The valve which is operated by member 84 and member 84 itself may be omitted if desired. The appliance is assembled and maintained in assembled form as described hereinabove.

Referring to FIGURE 14, an appliance in accordance with the invention may be a lamp comprising receptacle 20 attached to receiver 80″ from which tube 87 may lead to mantle 88. Valve 89 may be provided in line 87 if desired or may be omitted. When the appliance is assembled in the manner hereinabove described, and valve 89, if present, is opened, fluid (either gas or liquid) is dispensed upward through tube 87 to mantle 88, the fluid being gaseous when it enters mantle 88, either by reason of being gaseous before leaving receptacle 20 or by reason of being evaporated or atomized and evaporated before it reaches the interior of mantle 88.

Figure 15:
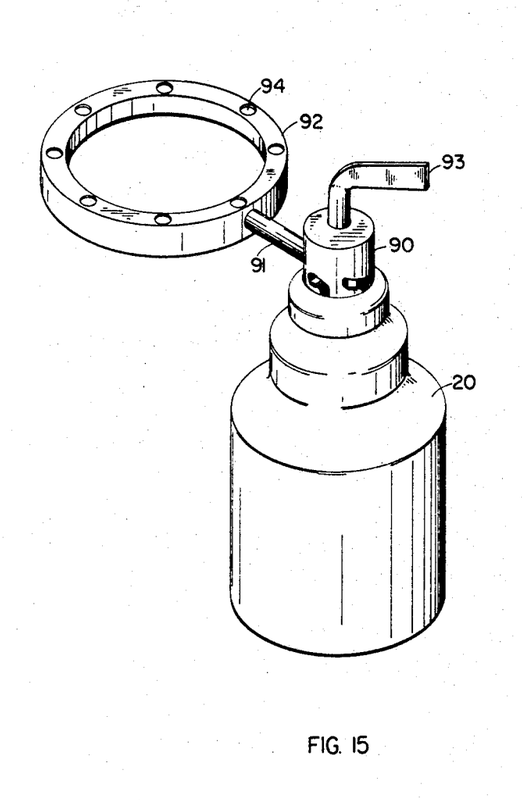
FIGURE 15 is a perspective view showing the application of the invention to a stove burner.

Referring now to FIGURE 15, an appliance in accordance with the invention may comprise receptacle 20, receiver 90, stove burner 92, and tube 91 leading from receiver 90 to burner 92. Line 91 may be provided with valve 93, or valve 93 may be omitted if desired. When the appliance is in the assembled form as shown, and as described hereinabove, fluid may be admitted to gas burner 92 when valve 93, if present, is opened. Gas preferably is dispensed from holes 94 in burner 92, preferably by reason of a volatile liquid being volatilized in receiver 90, tube 91, or burner 92.

Figure 16:
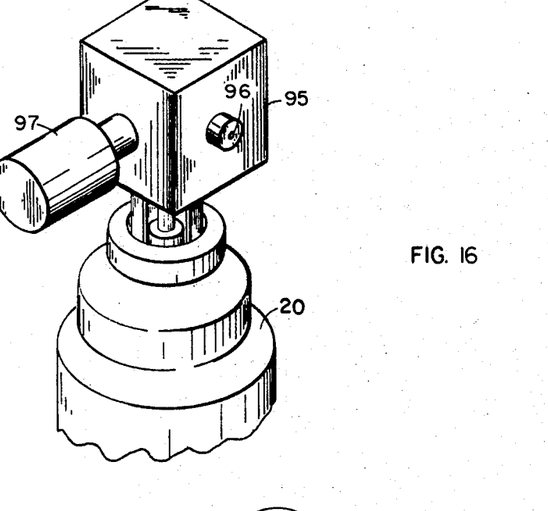
FIGURE 16 is a perspective view of the device as part of an appliance wherein the appliance is an aerosol insecticide dispenser.

Referring now to FIGURE 16, an appliance in accordance with the invention may be a device to dispense insecticides which comprises receptacle 20, receiver 94, provided with dispensing orifice 96 and solenoid 97 to operate a valve (not shown) within receiver 95. When the appliance is in the assembled form as shown and as described hereinabove, fluid may be admitted to orifice 96 when the valve is opened by operation of solenoid 97. Liquid is preferably dispensed from member 96; the liquid may be dispensed as a mist or aerosol, as shown, by reason of the pressure within receptacle 20 if member 96 is suitably designed.

Figure 17:
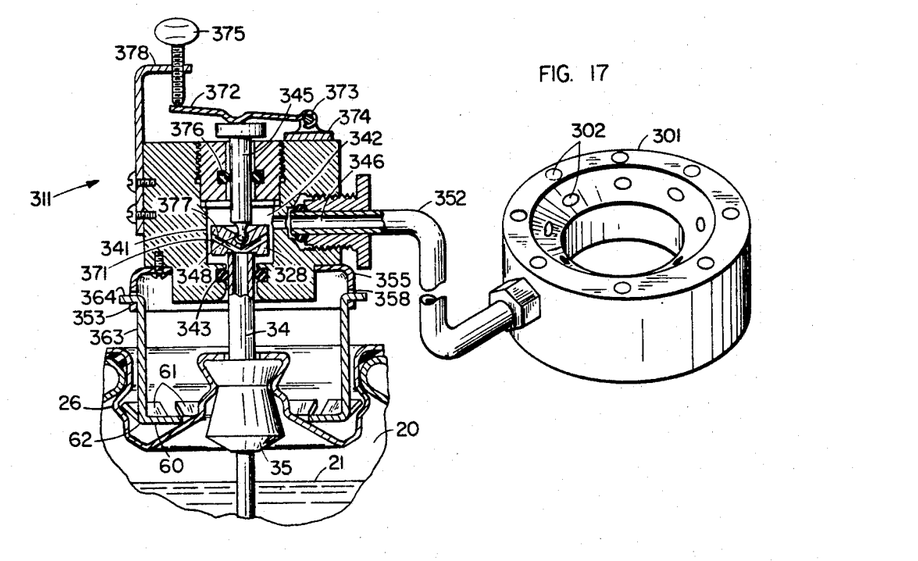
FIGURE 17 is a cross-sectional view of another embodiment of the device of the invention.

The appliance of FIGURE 17 comprises stove burner 301, a receiver indicated generally as 311, member 355 having surfaces 358, and receptacle 20 having part 60, with portions 363 and 364 which engage surfaces 353 and tube 352. Tube 352 is connected to body 340 of receiver 311 by conventional means, as shown, and its interior-space 342, defined by interior wall 341 of body 340. Orifice member 343, which may be an O-ring, as shown, sealingly engages the outer surface of tube 34.

Members 363 extend upwardly from member 60 at 62 and have portions 364 which engage the lower ramplike surfaces of spaces 358 in member 355 and portions 61 which engage portion 26 of receptacle 20.

Means to push tube 34 downward to open valve 35 may be provided by member 345, which may be slidably mounted in body 340 and may extend downwardly through inner wall 341 and be sealed to body 340 by O-ring 376.

The lower end of member 345 may be a ball 348 received in a socket in the upper surface of member 371, which may have a socket on its lower face to receive the upper end of tube 34 and may be provided with holes 377 extending upwardly and outwardly through member 371 communicably to provide a passage from the interior of tube 34 to space 342. Means to depress member 345 to any desired extent and thereby open valve 35 to any desired extent may comprise lever 372 extending across the top of member 345 and hingeable attached at 373 to bracket 374, which may be attached to body 340. Screw 375 may be threadedly engaged in bracket 378, which may be attached to body 340 as shown. Screw 375 is disposed to exert force downwardly on the end of lever 372 to slidably force member 345 into space 342 and toward valve 35. Combustible fluid 21 contained in receptacle 20 may be dispensed upwardly, as a liquid or a gas to valve 35, thence through the interior of tube 34, then through holes 377, space 342, passage 346, and tube 352 to burner 301. If fluid 21 is a liquid when it leaves valve 35, it preferably is evaporated or atomized and evaporated prior to reaching holes 302 in burner 301, so that when it emerges from holes 302 it is in the form of a gas.

Figure 18:
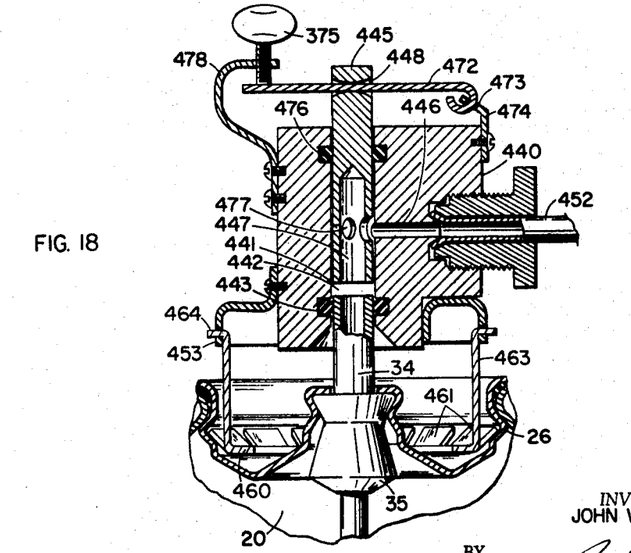
FIGURE 18 is a cross-sectional view of another embodiment of the device.

Referring now to FIGURE 18, there is shown another embodiment wherein receiver 440 is maintained in engagement with receptacle 20 by portions 464 of members 463 which engage surfaces 453 which is attached to body 440. Members 463 extend upwardly from member 460 and extend outwardly at 464; member 460 has portions 461 which engage portion 26 of receptacle 20. Within body 440, space 442 is defined by interior walls 441. Tube 34 extends into space 442 in sealing engagement with orifice member 443, which may be an O-ring as shown. Passage 446 extends outwardly from inner wall 441 through body 440 to the interior of tube 452, which is attached to body 440 in any conventional means as shown. Valve member 445, which may be cylindrical as shown may extend downward through body 440 into space 442 and be maintained in sealing engagement with body 440 by any suitable means, such as O-ring 476. Member 445 may be drilled or bored to provide space 447, so that its lower portion may be essentially tubular as shown, and the wall of this tubular portion may be provided with apertures such as holes 477 extending outwardly therethrough to communicate with passage 446.

Means to force member 445 slidably downward into contact with the end of tube 34 and to then further depress tube 34 to open valve 35 may comprise lever 472 extending through hole 448 in member 445 and hingeably attached at 473 to bracket 474, which may be suitably attached to body 440. Downwardly extending screw 375 may be threadedly engaged with bracket 478 so that its lower end bears downwardly on the end of lever 472, which is on the opposite side of member 445 from hinge 473.

By thus suitably rotating screw 475, member 445 may be lowered or raised to open or close valve 35, raising of 445 being accomplished by reason of a spring, not shown, within valve 35, which biases tube 34 upwardly and thereby forces member 445 upwardly when downward pressure on lever 472 is released by backing off screw 475. Fluid is dispensed upwardly from the orifice provided by the interior of tube 34, thence through space 442, space 447, holes 477, passage 446, and tube 452 to a burner portion or other part of a suitable appliance such as described hereinabove in connection with FIGURES 10 to 15.

Figure 19:
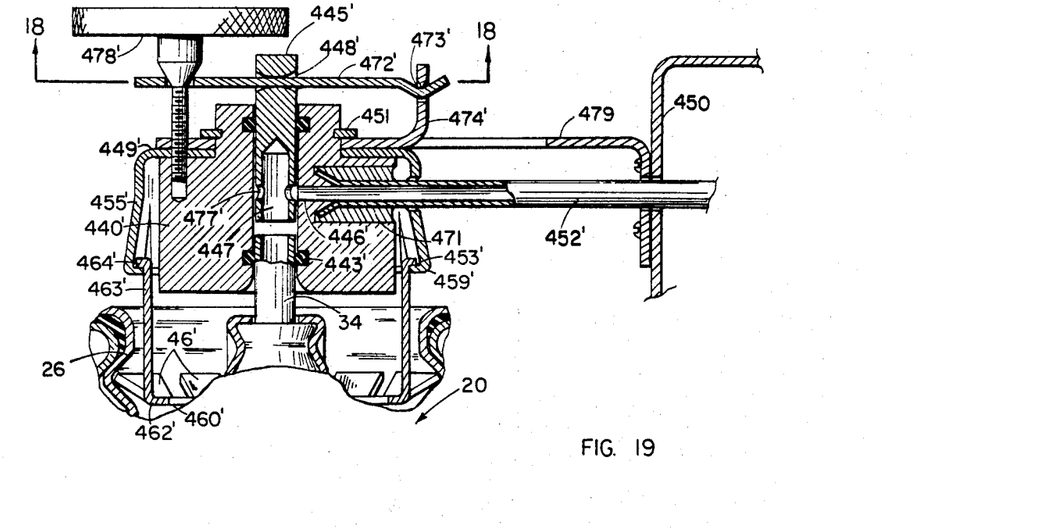
FIGURE 19 is a cross-sectional view of a modification of the embodiment of FIGURE 18.
Figure 20:
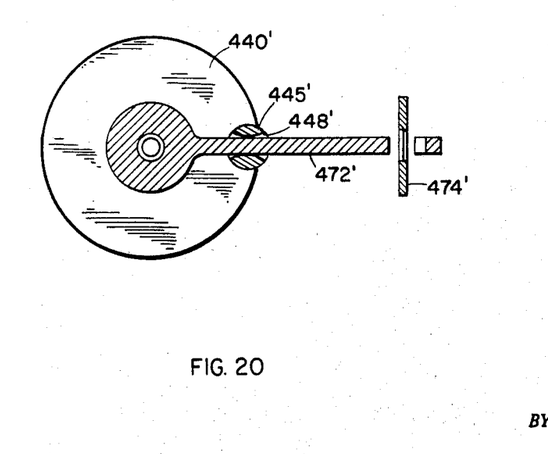
FIGURE 20 is a cross-sectional view taken on line 20—20 of FIGURE 19.

Referring now to FIGURES 19 and 20, there is shown another embodiment similar to that of FIGURE 18 and having many parts similar or identical thereto, these parts being indicated by primes. Receptacle 20 and body 440′ are held together by members 464′ extending outwardly from members 463′ which extend upwardly from member 460′ at 462′ by reason of engagement of portions 461′ of member 460′ with parts 26 of receptacle 20 and engagement between members 464′ and surfaces 453′ of ramplike members 459′ which extend inwardly from member 455′ in the manner of members 59. Orifice member 443 sealingly engages tube 34, the interior of which communicates through space 447′ and holes 477′, with passage 466′, which may lead to a burner or other suitable device, through tube 452′, which may be attached to body 440′ by adhesive or solder 471. Body 440′ may be attached to appliance frame member 450 by bracket 479 which, together with flange 449', may be secured to body 440' by snap ring 451. Bracket 474' may be provided as an upwardly extending stamped out portion of bracket 479. Hingeable engagement of lever 472', which extends through hole 448' in member 445', may be provided at 473' as a knife edge bearing. Screw 478' may extend through a hole in the end of lever 472' and be threadedly engaged in member 440'. Operation may be as in the embodiment of FIGURE 18.

Figure 21:
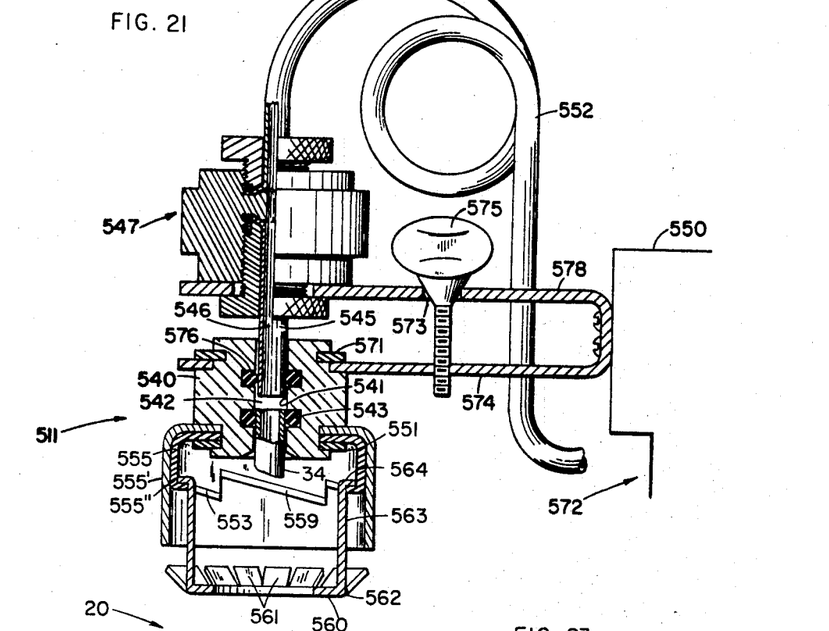
FIGURE 21 is a cross-sectional view of a modification of the embodiment of FIGURE 19.

Referring now to FIGURE 21, there is shown another embodiment wherein receptacle 20 is attached to body 540 of receiver 511 by engagement with surfaces 553 by portions 564 of members 563 extending generally horizontally from members 563 as hereinabove described. Cylindrical member 555 may consist of inner strand portion 555' and inner portion 555" having the same general configuration but having ramp-like members 559 (with upper surfaces 553) stamped out to extend inwardly therefrom in the manner of members 459'; members 555' and 555" may be attached to body 540 by snap ring 551. Parts 560, 561, 562, 563 and 564 may correspond to and operate in the same manner as parts 60, 61, 62, 63 and 64. Tube 34 is received in sealing engagement with orifice member 543 into space 542 defined by interior wall 541 of body 540.

Body 540 may be attached to frame member 550 of the appliance by bracket 574 (which is preferably slightly resilient) by snap ring 571.

Tubular member 545 may extend downward through body 540 into space 542, being slidably received in body 540 and maintained in sealing engagement therewith by sealing member 576, which may be an O-ring as shown. Member 545 may be attached to tube 552 in any suitable manner, such as by conventional connector or coupling 547, which may be attached to frame member 550 by slightly resilient bracket 578. Passage 546, within tubular member 545, communicates or provides a duct between space 542 and the interior of tube 552. Screw 575 extends through hole 573 in bracket 578 and is threadedly engaged in bracket 574. Tube 452 may be provided with a loop, as shown, or any other suitable means may be provided to make it possible for coupling 547 and body 540 to undergo translatory motion toward and away from each other. Member 545 may be forced downwardly into body 540 and into contact with the top of tube 34 to press tube 34 downwardly to open valve 35 by rotating screw 575 and thereby forcing the outer ends of brackets 574 and 578 together to force coupling 547 and body 540 to move toward each other, whereupon fluid is dispensed upward from receptacle 20 through the interior of tube 34, space 542, passage 546, and tube 552 to a burner member or other suitable portion of the appliance as described hereinabove in connection with FIGURES 10 to 15.

Figure 22:
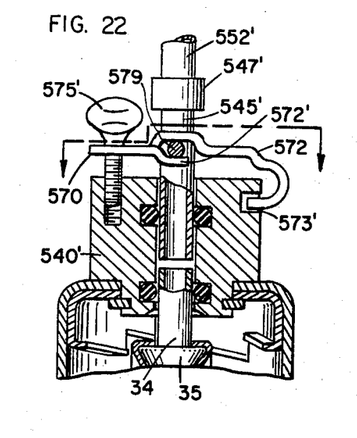
FIGURE 22 is a cross-sectional view of a modification of the embodiment of FIGURE 20.
Figure 23:
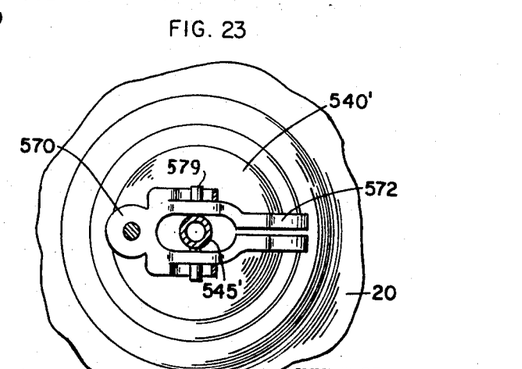
FIGURE 23 is a cross-sectional view taken on line 23—23 in FIGURE 22.

A modification of the embodiment of FIGURE 21 is shown in FIGURES 22 and 23 wherein valve operating members 545' is connected to outlet tube 552' by soldered connector 547'.

Valve operating screw 575' extends through a hole in one end of lever 572 and is threadedly engaged in body 540', being provided with shoulder 570 to engage the edge of the hole in lever 572. Lever 572 is engaged with the upper surfaces of pins 579, which may extend laterally from member 545'. Lever 572 may be provided with extending tabs 572' to engage the lower surfaces of pins 579; its end which is opposite screw 575' may be loosely engaged in space 573' to provide for its hingeable movement with respect thereto. Operation is as with the embodiment of FIGURE 21 in that operation of screw 575' may cause members 20 and 547' to move toward each other, whereupon the lower end of member 545' presses downwardly on tube 34 to open valve 35.

Figure 24:
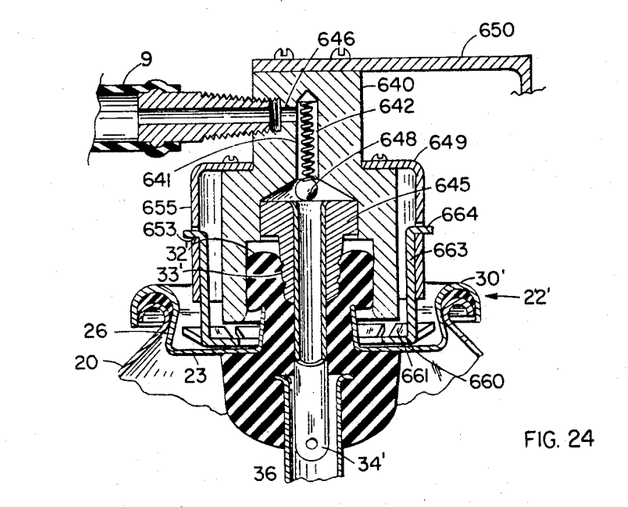
FIGURE 24 is a cross-sectional view of another embodiment.

As shown in FIGURE 24, container 20' comprises dished metal closure member indicated generally as 22', which correspond to closure 22 with respect to parts similarly numbered and has inner portion 30' extending upward from the inner periphery 31 of bottom 23 and is provided with substantially annular top portion 32' having hole 33' in the center thereof, through which tubular member 34' extends downwardly. This type of closure is described in United States Patents 2,860,820, and 2,683,484. Receptacle 20' may suitably form part of an appliance in accordance with the invention by reason of members 663, which extend upwardly from annular member 660, having outwardly extending portions 664 which engage ramp-like surfaces 653 in member 655. Portions 661 extend from member 460 to engage portion 26 of member 22'. Member 655 may extend outwardly and downwardly from body 640 as shown, being attached thereto by any suitable means, such as screws.

Body 640 is provided with downwardly extending tube or orifice member 34' and with member 645 to maintain it in place. Orifice member or tube 34' sealingly engages with portion 32' of the closure in the manner described in the previously mentioned patents. Portion 32' acts to prevent removal of fluid from the receptacle when tube 34' is withdrawn by leakage or otherwise and thus constitutes a valve which is opened by member 34'. Check valve 648 may be provided in the interior space 642 defined by interior walls 641 of body 640, and passage 646 may lead outward from space 642 to tube 652, which may lead to another part of the appliance. In place of or in addition to check valve 648, the valve of FIGURE 9 may be provided with body 640 and may, if desired, be attached to frame member 650 of the appliance.

Figure 25:
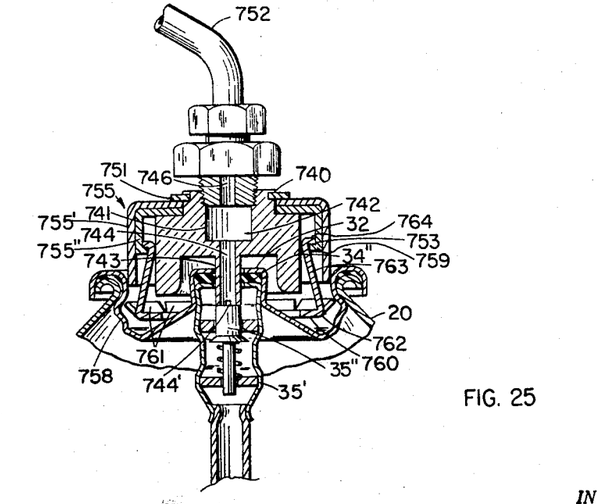
FIGURE 25 is a cross-sectional view of still another embodiment.

In the embodiment of FIGURE 25, receptacle 20 is provided with valve 35' which differs from valve 35 in that a cylindrical member must be introduced downward through the orifice provided by the hole in the center of sealing washer 34" which underlies top portion 32 of closure 22. Body 740 may be provided with downwardly extending tubular orifice member 743, which may be provided with orifice or duct 744 in the interior thereof leading from the interior of valve 35' to space 742 in the interior of body 740, defined by interior walls 741 of body 740. The end of member 743 may engage the top of a valve member such as member 35" within valve 35' to push it downwardly to open the valve and may be provided with opening 744', which may be an orifice, to provide communication between the interior of valve 35' and duct or orifice 744. The outer surface of member 743 is sealingly engaged by the inner edge of member 34". Passage 746 may lead from body 740 to tube 752, which may lead to another portion of the appliance. Body 740 may be maintained engaged with receptacle 20 by inwardly extending portions 764 of members 763, which engage surfaces 753 of member 755 which may be attached to body 740 by snap ring 751. Members 755, 755', 755", 759, 753, 760, 761, 762, 763 and 764 may correspond to and operate in the manner of members 555, 555', 555", 559, 553, 560, 561, 562, 563 and 564. A valve or check valve may be provided within space 742 in the manner discussed in connection with previously described embodiments.

Due to difficulties in creating and maintaining a suitable seal at all points between passage 646 or 746 and the interior of the receptacle, the embodiment of FIGURE 25 is less preferred than other embodiments, and the embodiment of FIGURE 24 is unpreferred.

It may thus be seen that the invention is broad in scope and includes such modifications as will be apparent to those skilled in the art and is to be limited only by the claims.

Having thus described my invention, I claim:

1. In a device comprising a pressurized valved receptacle having a valve and containing fluid under pressure and an appliance for dispensing said fluid and utilizing the potential energy stored in said fluid by reason of said pressurization;

wherein said receptacle comprises a dished metal closure member having a horizontally-extending annular bottom, an outer circular portion extending upwardly from the outer edge of said annular bottom and extending inwardly at its upper portion to terminate at its upper peripheral portion with a crimped seal to the body of said receptacle, an inner portion extending upwardly from the inner edge of said annular bottom, a substantially annular top portion on said inner portion having a hole in the center thereof through which a tubular member extends, said fluid being dispensed through said tubular member;

apparatus to maintain said receptacle in engaged relation with said appliance and open the valve in said receptacle;

said apparatus comprising a substantially annular member surrounding said inner upwardly extending portion and lying against said bottom, a plurality of members extending diagonally outward and upward from the outer periphery of said annular member into the metal of said outer circular portion, and a plurality of members extending upwardly from the outer periphery of said annular member and thence substantially horizontally;

and, as a part of said appliance, a receiver having an outer wall and an inner wall defining a space therewithin, tube means extending from said appliance through said inner wall, an orifice member in said receiver, said orifice member having an orifice communicating with said space in said receiver and communicatingly engaged with the interior of said receptacle through said hole in said annular top portion;

said orifice member depressing said tubular member to open said valve in said receptacle;

and a substantially circular downward extending member attached to said receiver and provided with a plurality of surfaces equal in number and spacing to the said portions extending upwardly and outwardly from said annular member, each of said surfaces having a beginning and an end and extending in an arc around the axes of said orifices and extending upward from its beginning to its end;

each of said surfaces being engaged by the horizontally extending portion of one of said upwardly and horizontally extending portions.

2. The apparatus of claim 1 provided with two of said upwardly and outwardly extending portions.

3. The apparatus of claim 2 provided with four of said upwardly and outwardly extending portions.

4. The apparatus of claim 1 provided with two of said members which extend diagonally upward and outward from the outer periphery of said annular member.

5. The apparatus of claim 4 provided with more than two of said members which extend diagonally upward and outward from the outer periphery of said annular member.

References Cited by the Examiner

UNITED STATES PATENTS

| | | | |
|---|---|---|---|
| 2,825,325 | 3/1958 | Ross | 158—32 X |
| 2,840,032 | 6/1958 | Reeves | 116—112 |
| 2,841,694 | 7/1958 | Webster | 158—32 X |
| 2,860,820 | 11/1958 | Falligant | 158—33 X |
| 2,943,766 | 7/1960 | Orr | 123—187.5 X |

LAVERNE D. GEIGER, *Primary Examiner.*

H. BELL, *Examiner.*